United States Patent [19]

Hartmann

[11] Patent Number: 4,687,231
[45] Date of Patent: Aug. 18, 1987

[54] IDENTIFICATION CARD READABLE BY A MAGNETIC SYSTEM

[75] Inventor: Hans Hartmann, Stuttgart, Fed. Rep. of Germany

[73] Assignee: George Hartmann GmbH & Co. KG, Fed. Rep. of Germany

[21] Appl. No.: 809,379

[22] Filed: Dec. 16, 1985

[30] Foreign Application Priority Data

Dec. 20, 1984 [DE] Fed. Rep. of Germany ....... 3446412

[51] Int. Cl.$^4$ .............................................. B42D 15/00
[52] U.S. Cl. ...................................... 283/82; 283/111; 283/904
[58] Field of Search ................. 283/82, 107, 111, 112, 283/904

[56] References Cited

U.S. PATENT DOCUMENTS 4,425,421  1/1984  Rutges et al. .................... 283/904 X
4,592,976  6/1986  Whitehead ....................... 283/904 X

FOREIGN PATENT DOCUMENTS 2802430  7/1978  Fed. Rep. of Germany ...... 283/904
2838604  5/1980  Fed. Rep. of Germany .
43660  3/1980  Japan .................................. 283/904

Primary Examiner—Paul A. Bell
Attorney, Agent, or Firm—Jones, Tullar & Cooper

[57] ABSTRACT

In an identification card to be read by a magnetic system, having two protective plates between which a plate-like data carrier is held and protected, this data carrier being made of a material acting upon a magnetic field and having zones providing the data and acting variously upon the magnetic field, it is proposed, in order to lengthen the life of the card as well as to provide greater security against counterfeiting, that the two protective plates be made from non-magnetizable metal, preferably sheet bronze, and that the data carrier be embedded between the two protective plates in a layer of adhesive, plastic or solder, the two protective plates being thereby firmly joined together.

17 Claims, 4 Drawing Figures

IDENTIFICATION CARD READABLE BY A MAGNETIC SYSTEM

FIELD OF THE INVENTION

The invention relates to an identification card which is meant to be read using a magnetic system. The card has two protective plates, between which a sheet-like data carrier is retained in protected fashion. The data carrier is made of a material that acts on a magnetic field, and it has zones which provide the data and which act variously upon the magnetic field.

BACKGROUND OF THE INVENTION

An identification card of this kind, known from German patent disclosure document No. DE-OS 28 38 604, has plastic plates acting as the protective plates. Plastic plates of this kind undergo severe mechanical wear; their behavior at low temperatures is undesirable; they tend to fissure and break; and at temperatures beyond 60° C., severe deformation occurs. In time, because the plasticizer migrates, these protective plates tend to become brittle even under normal conditions. As a result, replacement cards are needed relatively frequently.

OBJECT AND SUMMARY OF THE INVENTION

To overcome these disadvantages, it is accordingly the object of the present invention to provide an identification card of the above general type, which is resistent to environmental influences and has a long useful life, while reliably protecting the data carrier.

In order to attain this object, the invention provides that the two protective plates be of non-magnetizable metal, preferably sheet bronze, and that the data carrier be received between the two protective plates in a layer of adhesive, plastic or solder, the two protective plates being firmly joined together via this layer.

Particularly long life and a substantial lessening of the danger of buckling are attainable if the layer is of permanently elastic material, preferably rubber, a rubber-like plastic, acrylate adhesive, or the like.

In an identification card in which the zones that provide the data and act variously upon the magnetic field are holes, these holes may be filled completely with the material making up the layer that firmly joins the protective plates to one another.

In a particularly advantageous feature, a recess can be provided in one of the protective plates, into which an optically readable data carrier, preferably a photograph, is fitted vertically flush with the protective plate and held in place by the adhesive or plastic layer. This provision largely protects the optionally readable data carrier from damage and wear.

In order to make counterfeiting as difficult as possible, the adhesive or plastic layer can be of a hardenable material that is still free-flowing while the card is being made.

Particularly long life on the part of the identification card is attainable if the protective plates are of bronze rolled out until resilient, and optionally provided with a surface refinement as well. To save weight, the protective plates may be relatively thin, for instance having a thickness of only about 0.2 mm.

The thickness of the layer may amount to approximately 0.4 mm, so that a total thickness of only 0.8 mm is required for the card, which is very flexible in use and is capable of withstanding severe bending without permanent deformation.

The invention will now be described in detail in terms of a preferred exemplary embodiment, as shown in the drawings.

DESCRIPTION OF THE PREFERRED EMBODIMENT

Figure 1:
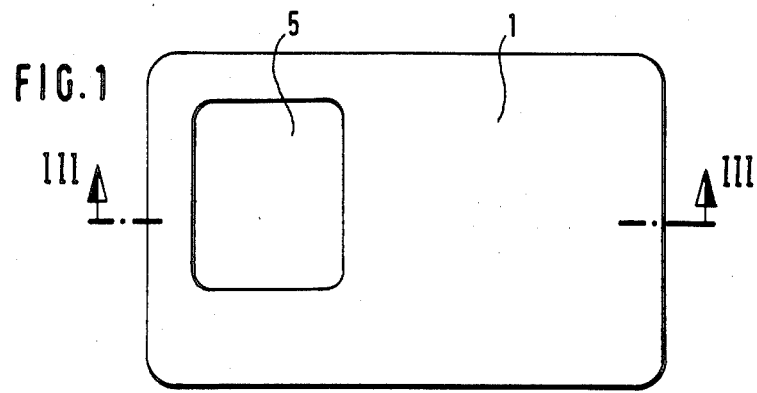
FIG. 1 is a plan view of an identification card.
Figure 2:
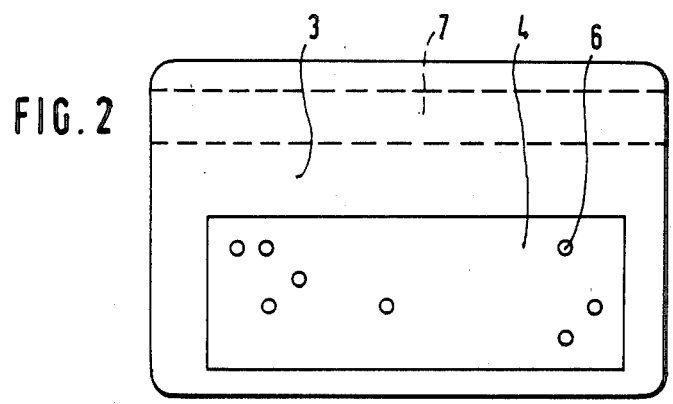
FIG. 2 is a corresponding plan view of the identification card shown in FIG. 1 but with the upper protective plate left out.
Figure 3:
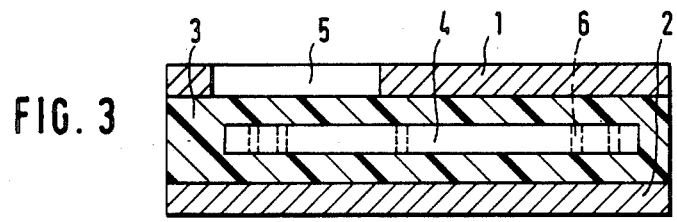
FIG. 3 is a section taken through the identification card shown in FIG. 1 along the line III—III of FIG. 1.

The identification card shown by way of example comprises an upper protective plate 1 and a lower protective plate 2, each defining an engagement surface between which a data carrier 4 is embedded in a layer 3 of rubber, of rubber-like material, in particular plastic, or of adhesive or solder, which engages the engagement surfaces. In the sectional view of FIG. 3, the layer thicknesses are shown with substantial vertical exaggeration. The thickness of the protective plates 1 and 2 amounts to only approximately 0.2 mm each. The thickness of the layers of adhesive or the like between the protective plates 1, 2 and the data carrier 4 is only on approximately the same order of magnitude, so that the total thickness of the identification card is only about 0.8 to 1 mm. The protective plates 1, 2 themselves are preferably of sheet bronze, rolled out until resilient, which is relatively resistant to corrosion and may additionally be provided with surface refinement, so that even with frequent use only limited wearing away takes place. In order to be able to distinguish the identification card visually as well, a photograph, company logo or other marking of a kind typically found on such a card is fitted as flush as possible into a recess 5 in the upper protective plate 1 and is thereby protected from damage.

The data carrier 4—for example a magnetic tape—has parts or zones 6 differing from the rest of the carrier 4 in acting upon a magnetic field. These parts or zones 6 can be created or changed by a magnetic field and they form in their totality readable variable data fields. If the parts or zones 6 are holes, then in their totality, these holes provide the non-variable data of the identification card. The data carrier 4 comprises some material acting upon a magnetic field, such as magnetizable metal, so that the data can be read using a magnetic system.

In addition, a further data carrier 7, such as a magnetic tape, can be disposed parallel to the data carrier 4; by this means, data that can be varied by varying the magnetization can be stored, for instance for the purpose of making payments electronically or the like, as is known for instance in coinless or card-operated telephones. The further data carrier 7 can be suitably disposed between the protective plates 1, 2 beside the first data carrier 4, so that this data carrier 7 as well is completely protected by the protective plates 1, 2. A further possibility is to dispose the further data carrier 7 in a recess or hole in one of the protective plates 1, 2. Disposing it near the surface facilitates magnetization; however, it also increases the danger of damage.

Figure 4:
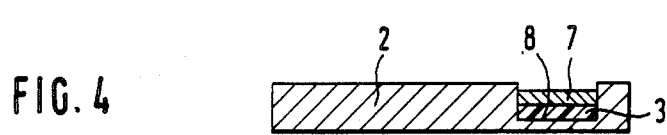
FIG. 4 is a corresponding section taken through another form of identification card.

In the further exemplary embodiment of an idenfitication card shown in FIG. 4, only one protective plate 2 is provided, which has a groove 8 on one side in which a further data carrier 7 is firmly retained approximately flush with the surface by a layer 3.

What is claimed is:

1. An identification card to be read using a magnetic system, comprising:
    two protective plates of sheet bronze, each protective plate defining an engagement surface;
    at least one sheet-like data carrier comprising a material acting upon a magnetic field and having at least one data zone; and
    an elastic layer situated between the protective plates and in engagement with the engagement surfaces to firmly join the protective plates, each data carrier being situated in the elastic layer and held therein in a protected manner.

2. The identification card as defined in claim 1, wherein the elastic layer is selected from the group comprising adhesive, plastic or solder.

3. The identification card as defined in claim 1, wherein the elastic layer comprises permanently elastic material selected from the group comprising rubber, a rubber-like plastic or acrylate adhesive.

4. The idenfitication card as defined in claim 1, further comprising:
    an optically readable data carrier, wherein a recess is provided in one of the protective plates in which the optically readable data carrier is situated to be approximately flush with the protective plate defining the recess, said optically readable data carrier being held by said plastic layer.

5. The identification card as defined in claim 1, wherein the elastic layer comprises a hardenable material which is free-flowing while the card is being made.

6. The identification card as defined in claim 1, wherein the sheet bronze protective plates are rolled out until resilient.

7. The identification card as defined in claim 1, wherein the protective plates have a thickness of approximately 0.2 mm.

8. The identification card as defined in claim 1, wherein the elastic layer has a thickness of approximately 0.4 mm.

9. The identification card as defined in claim 1, wherein two sheet-like data carriers are provided, at least one of which includes the capacity for variable data.

10. The identification card as defined in claim 9, wherein the two sheet-like data carriers are disposed parallel to each other.

11. The identification card as defined in claim 9, wherein one of the protective plates includes a groove into which the data carrier having the capacity for variable data is disposed.

12. The identification card as defined in claim 9, wherein the data carrier including the capacity for variable data comprises a piece of magnetic tape.

13. The identification card as defined in claim 1, wherein said at least one data zone provides variable data.

14. The identification card as defined in claim 13, wherein the data zone providing non-variable data comprise holes in the data carrier which are filled with the elastic layer.

15. The identification card as defined in claim 1, wherein said at least one data zone provides non-variable data.

16. The identification card as defined in claim 1 wherein a variable data zone and a non-variable data zone are provided.

17. An identification card to be read using a magnetic system, comprising:
    a protective plate of sheet bronze, said plate including a groove extending into said plate from one surface thereof;
    an elastic layer;
    at least one sheet-like data carrier situated within the elastic layer, said data carrier comprising a material acting upon a magnetic field and having zones providing nonvariable data, said elastic layer being situated within the groove; and
    a further data carrier situated flush within the groove and in engagement with the elastic layer, said further data carrier having the capacity for variable data.

* * * * *